United States Patent [19]
Knipe et al.

[11] Patent Number: 5,867,202
[45] Date of Patent: Feb. 2, 1999

[54] MICROMECHANICAL DEVICES WITH SPRING TIPS

[75] Inventors: Richard L. Knipe, McKinney; Mark H. Strumpell, Plano; Michael A. Mignardi, Dallas, all of Tex.

[73] Assignee: Texas Instruments Incorporated, Dallas, Tex.

[21] Appl. No.: 768,007

[22] Filed: Dec. 13, 1996

[51] Int. Cl.⁶ .............................. B41J 2/47; G02B 26/00
[52] U.S. Cl. ............................ 347/239; 359/295
[58] Field of Search ........................ 347/239; 348/571; 359/224, 214, 221, 223, 226, 198, 295

[56] References Cited

U.S. PATENT DOCUMENTS

| | | | |
|---|---|---|---|
| 5,285,196 | 2/1994 | Gale, Jr. | 345/108 |
| 5,331,454 | 7/1994 | Hornbeck | 359/224 |
| 5,447,600 | 9/1995 | Webb | 216/2 |
| 5,535,047 | 7/1996 | Hornbeck | 359/295 |

*Primary Examiner*—N. Le
*Assistant Examiner*—Thinh Nguyen
*Attorney, Agent, or Firm*—Julie L. Reed; Richard L. Donaldson

[57] ABSTRACT

A micromechanical device (50) with spring tips (60) and its method of manufacture. A micromechanical device (50) is formed such that there is a deflectable element (36) suspended by at least one hinge (24a) over an air gap, at the bottom of which are landing stops (34a). The element (36) deflects on said hinge and comes into contact with the landing stops (34a) via at least one small metal protrusion (60), or spring tip. The spring tip flexes upon contact allowing more even distribution of forces and less wear and adhesion. The spring tips are formed in standard semiconductor processing steps with the addition of patterning the metal layer (64) from which the hinges are formed to create separated metal elements. When the deflectable element is formed, the metal forming that element bonds to the separated metal elements at the tips, thereby forming the spring tips.

10 Claims, 3 Drawing Sheets

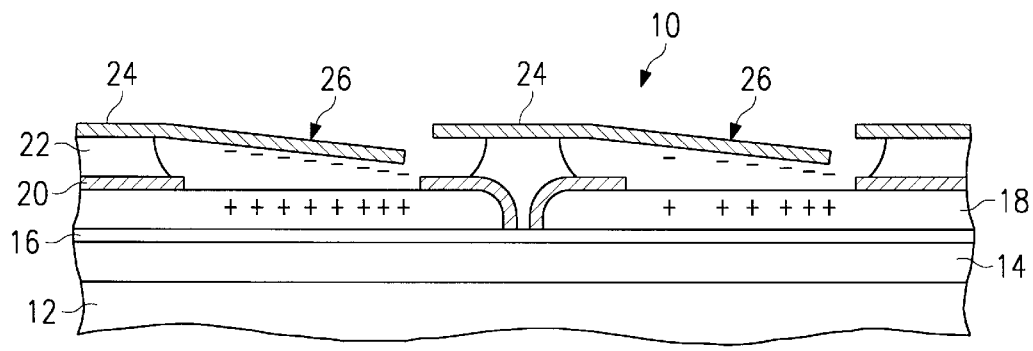
FIG. 1
(PRIOR ART)
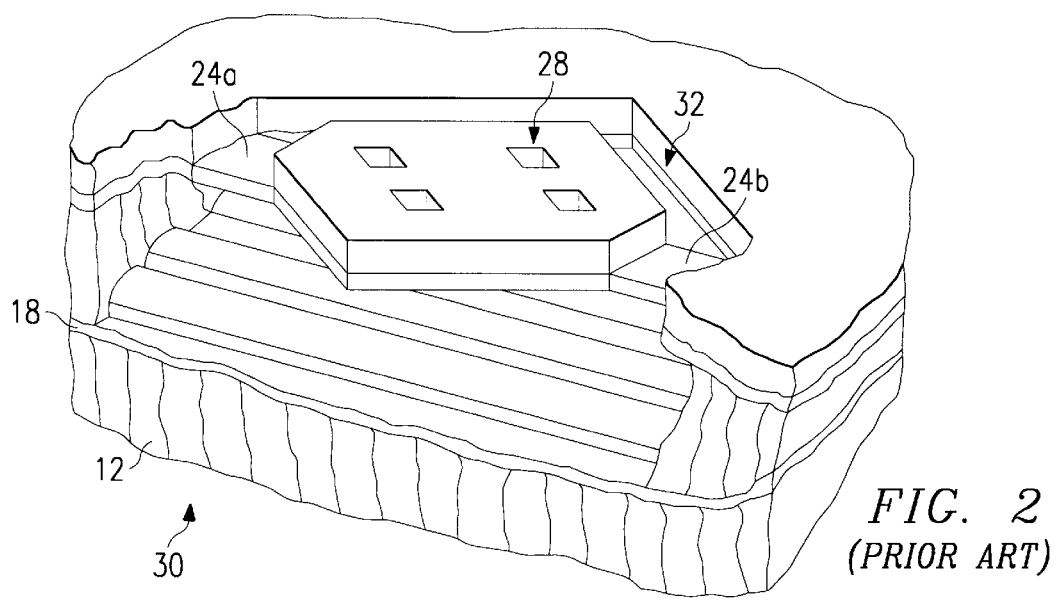
FIG. 2
(PRIOR ART)
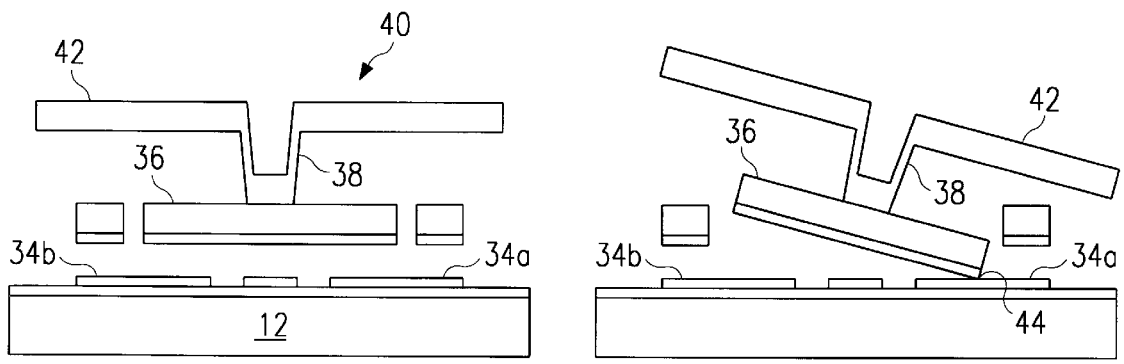
FIG. 3a
(PRIOR ART)
FIG. 3b
(PRIOR ART)

MICROMECHANICAL DEVICES WITH SPRING TIPS

BACKGROUND OF THE INVENTION

1. Field of the Invention

This invention relates to spatial light modulators, more particularly to micromechanical spatial light modulators.

2. Background of the Invention

Spatial light modulators in some embodiments consist of arrays of individually addressed elements. Examples of these type of modulators include liquid crystal devices (LCD), digital micromirror devices (DMD™), and actuated mirror devices (AMA™). The DMD and the AMA are micromechanical devices, meaning that they have miniaturized parts that move when the elements are activated.

Micromechanical modulators have the advantage of being a product of manufacturing processes that are compatible with most semiconductor processing steps. They have a further advantage that they can be manufactured on an extremely small scale. Their moving parts are very simple, typically a flap that deflects either in one of two directions, or in one direction. They are activated by electrostatic or piezoelectric forces, for example, that cause the flap to deflect. When the flap deflects, the reflection angle of light that impinges on the surface of the flap changes.

These modulators can be operated in an analog fashion or digitally. In the analog mode, they typically achieve a range of angles of deflection based upon the forces between the flap and the addressing circuitry. To operate digitally, they typically deflect to a stable position, more often than not coming to rest against some type of landing stop.

With the move to digital imaging in areas such as printing and displays, the desirability for a digitally operated spatial light modulator has increased. However, in digital operation, while more stable than analog, the repeated contact between the deflected element and its landing stops causes the element to stick to the landing stops. Once stuck, these elements cause bright or dark spots on the final image.

Therefore, a solution is needed that prevents or mitigates the problems caused by the sticking of these elements to their landing stops.

SUMMARY OF THE INVENTION

In one aspect of the invention, a spatial light modulator is manufactured that has small metal protrusions from the areas of a reflectable element that come in contact with landing stops. The small protrusions, sometimes referred to as spring tips, touch down against the landing stop and deform as the element comes to rest. The deformation brings more surface area into contact than if the deflected element alone touched the landing stop, and slows down the time in which contact is made. The result is an element that can be more easily lifted off of its landing stop with reduced sticking forces when the element is reset to its undeflected state.

It is an advantage of the invention in that it has improved reset efficiency because of the flexible nature of the spring tip.

It is an advantage of the invention in that it distributes landing pressure more evenly on the surface of the landing stop.

It is an advantage of the invention in that is increases the amount of time over which the landing shock occurs.

It is an advantage of the invention in that it compensates for structural problems in the micromechanical element.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 shows a side view of prior art embodiment of a single-level cantilever hinge spatial light modulator element.

FIG. 2 shows a perspective view of a prior art embodiment of a single-level torsion hinge device.

FIGS. 3a and 3b show a side view of prior art embodiment of a double-level torsion hinge device.

DETAILED DESCRIPTION OF THE PREFERRED EMBODIMENTS

Figure 4:
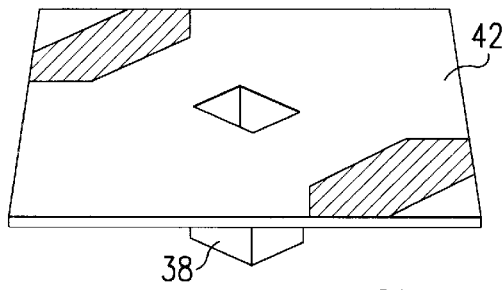
FIG. 4 shows one embodiment of the present invention.

With reference to FIGS. 1, 2, 3a and 3b, the prior art is discussed relative to micromechanical spatial light modulator elements. However, the nature of the invention is such that it is applicable to any micromechanical device with contacting elements, and would reduce wear and adhesion in those structures as well.

Referring now to FIG. 1, a prior art embodiment of a single-level cantilever hinge spatial light modulator element is shown. In single-level devices, the deflectable element is both the optically and electrically active area. The deflectable element is electrically active in that it is the element that deflects when the electrostatic or other attractive forces build up to cause the element to move. The top of this electrically active element reflects the incident light, making it also the optically active element. This device is discussed in further detail in U.S. Pat. No. 4,596,992.

In FIG. 1, the substrate 12 has formed into it some type of electrically active areas in a layer 14. The layer 14 may have an optional oxide coating 16 for protection and electrical isolation. Formed upon layer 18, with vias possibly cut to allow electrical connection, is addressing circuitry 20. Layer 18 is an oxide coating under metal addressing circuitry layer 20 to electrically isolate this addressing circuitry from the structural elements of the micromechanical devices. In this embodiment, the layer 22 acts as both a spacer and a support for the reflective element 26.

The spacer 22 is spun onto the previous layers to support a deposited metal film. The metal film is patterned and etched to form hinges 24 and elements 26. The spacer layer is then etched in strict time-control to remove the spacer from under the element 26 but leave it intact under the hinge 24. In alternate embodiments, this device could have vias formed in the spacer and filled with metal to form support posts. In that case, the spacer is no longer needed for support and is etched until gone.

In operation, when the addressing circuitry in layer 18 is activated, electrostatic forces cause the element 26 to deflect along the hinge 24 towards the addressing circuitry. As mentioned previously, the attractive force could be some other type of force than electrostatic, such as magnetic. In some embodiments, this element does not come into contact with the addressing circuitry, but in others it can. Of interest to the discussion here is those that can. The repeated activation of these elements and their contact with a landing stop or substrate eventually causes the element to stick to the landing stop. This problem is common among micromechanical devices.

A second prior art embodiment of these type of devices is shown in FIG. 2. In this embodiment, the substrate 12 has upon it electrode layer 18, which is typically metal. The element 28 is supported by hinges 24a and 24b over gap 32. The hinges 24a and 24b are formed out of a first layer of metal that is thinner than the element 28. After the first layer is deposited, the metal is patterned and etched to form the hinges. This would also be the layer of metal from which the support posts are formed, as mentioned previously. The result is that the element 28 is really made up of two layers of metal, the hinge metal and the element metal, which is deposited in a second metal layer.

The operation of this device is bistable, meaning that is can deflect in two ways from the flat state. If the addressing circuitry on the near side were activated the element would deflect in a direction coming out of the page, toward the viewer. If the addressing circuitry on the far side were activated, the element would twist about its hinges away from the viewer. This device is described in more detail in U.S. Pat. No. 5,061,049.

Both of the embodiments in FIGS. 1 and 2 are single-level devices. The elements 26 and 28, respectively, are both the deflecting element and the reflecting surface. In FIGS. 3a and 3b, a double-level device is shown in which the deflectable element is not the optically active area.

In FIG. 3a, the device is shown in its unaddressed or undeflected state. The substrate 12 has upon it landing electrodes 34a and 34b, which stop the element when it deflects. The deflectable element 36 is suspended by hinges along the axis coming out of the page, not shown, over these electrodes and the addressing electrodes. On the deflectable element 36 is a support post 38 and a second element 42. The support post is typically located in the center of the hinge axis of the deflectable element 36.

The operation of the device is shown in FIG. 3b. When the address electrode on the right side of the drawing is activated, the deflectable element deflects towards that side and comes to rest on the electrode 34a. The element 42 moves in accordance with the motion of the element 36, because of support post 38. Area 44 shows the point at which the deflectable element contacts the landing electrode and where the problems of wear and adhesion occur. This device is discussed in more detail in U.S. Pat. No. 5,535,047 and assigned to a common assignee as the present invention.

A perspective drawing of such a double-level device incorporating one embodiment of the invention is shown in FIG. 4. The top element 42 and its support post 38 have been "lifted off" of the drawing to show a perspective view of the yoke, or deflectable element 36. The hinges 24a and 24b receive support from support posts 54. The support post 56 and the opposite support post are for adjacent devices in a array of such devices.

In this embodiment of the invention, an additional structural element has been added to the deflectable element 36. Small protrusions 60, typically formed out of metal, are attached to the element 36. These small metal protrusions have a finger like structure, or cantilevered structure, and will hereinafter be referred to as spring tips.

These spring tips will be the part of the deflectable element that now comes into contact with the landing electrodes. Because of their thin and flexible structure, they deform upon contact, causing more surface area to come into contact with the landing electrode than that which touches when the element 36 alone contacts. This allows a more even distribution of the landing forces over the surface area and minimizes adhesion and wear.

The flexible nature of the additional structures also adds more time to the contact process. As they touch the landing electrodes, they flex and the elements continue to deflect until they have fully flexed. This process takes longer than when the deflectable element's tip alone touches. This reduces the landing shock between the element and the electrode.

As a result of these structures being added, the reset process of the device is easier. Typically, reset of these elements occurs by manipulating the voltages to cause the element to lift off the electrodes. In a preferred embodiment, the reset is achieved by applying a voltage to the element or the addressing circuitry to cause it to be even more strongly attracted to the addressing circuitry. This builds restoring force in the hinge. When the voltage is removed, the device "bounces" off of the electrode.

With the use of spring tips, less voltage is needed to store energy, since the spring tips are more flexible. When the voltage is applied, these spring tips build restoring force much faster and stronger than the tip of the element alone. Having more "spring" they provide higher restoring force. This allows for a reduction in the voltage applied and reduces wear on the deflectable element.

Additionally, some times the process in which devices such as this does not achieve the desired structural integrity. Two examples of this type of failing are called tip sag and hinge sag. For example, occasionally the hinges do not have enough internal tensile strength to remain planar and they sag. This normally causes increased forces at the contacting point. With the spring tip this effect is mitigated and devices with the hinge sag defect may still be usable. Similarly, when the tensile strength of the deflectable element is not high enough, among other reasons, the element itself may sag at its tips. Again this increases the forces that may result in adhesion. The use of the spring tips again mitigate these effects.

Figure 5:
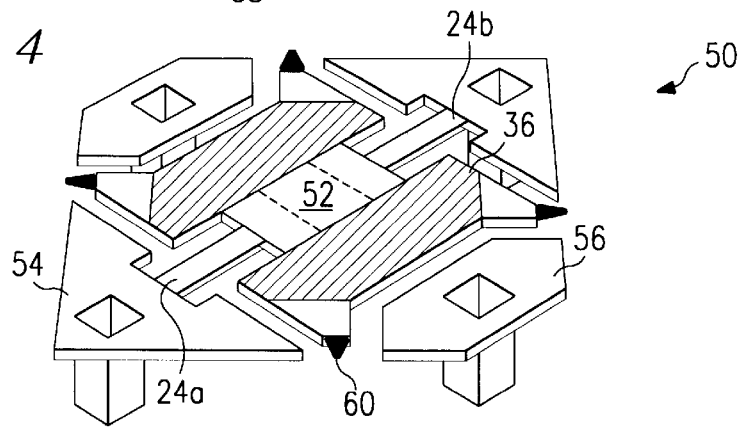
FIGS. 5–6, 7a, 7b, 8, 9, 10 show side view of a substrate as it progresses through the steps of manufacture resulting in one embodiment of the present invention.

The manufacture of the devices, either double-level or single-level, only needs slight changes to provide these extra structural components. The substrate is shown in side views in FIGS. 5–10 as it undergoes the various steps of the process. In FIG. 5, the substrate 12 has the addressing layer 18 and an insulating layer 20. The spacer 22 has been spun on and the vias 62a and 62b for this element in the area have been formed.

Figure 6:
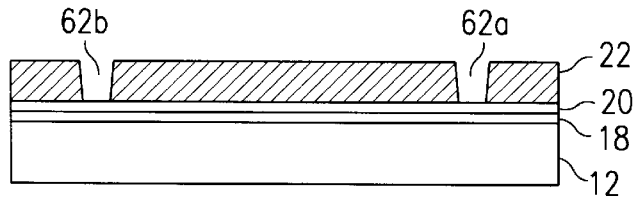

A first metal layer 64 is deposited in FIG. 6. The metal layer 64 fills the vias 62a and 62b to form support posts. This layer is then patterned and etched to form the hinges and to form the separate structures which will become the spring tips. At this stage in the process the spring tips are small pieces of metal that are separated from the existing structural component.

Figure 7A:
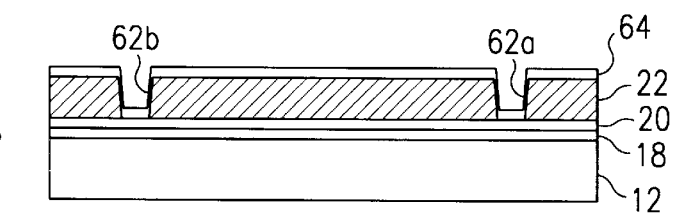
Figure 7B:
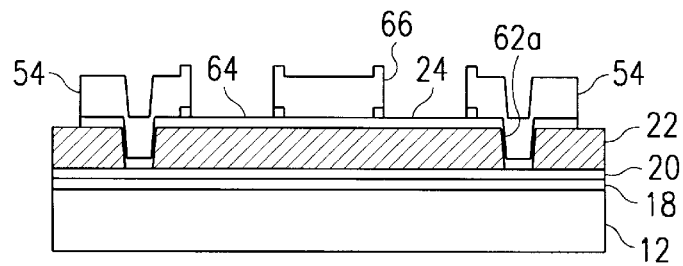

In the next step of the process when the deflectable element is formed, shown in FIGS. 7a and 7b, the second metal layer attaches to the separated spring tips. This metal layer is then patterned and etched to form the deflectable element. In single-level devices, the element is formed with enough size to be an effective reflecting surface as shown. Comparing FIGS. 7a and 7b, it will be noted that in FIG. 7a the size of the element 66 is much larger than that in FIG. 7b. The only remaining step in the process for the structure shown in FIG. 7a would be to etch the spacer 22 to allow the element to move freely.

Figure 8:
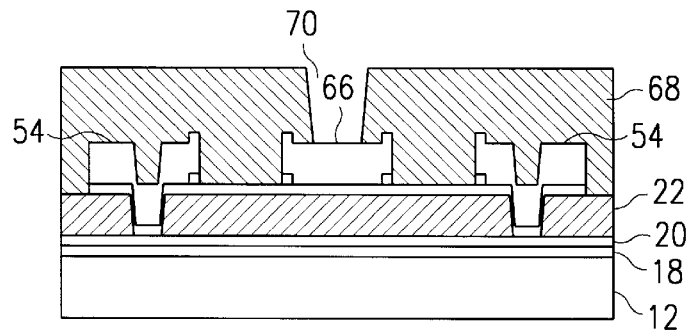

However, for the double-level devices, as shown in FIG. 7b, there are remaining steps to be performed. In FIG. 8, the second spacer layer 68 is formed over the deflectable element and its posts 54. The number 66 shows the spot on the deflectable element where the post will reside.

Figure 9:
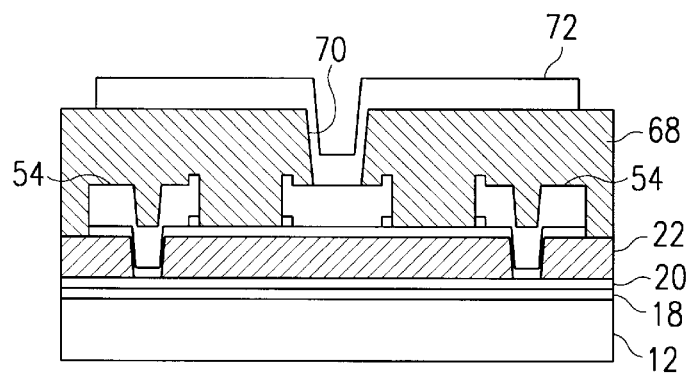
Figure 10:
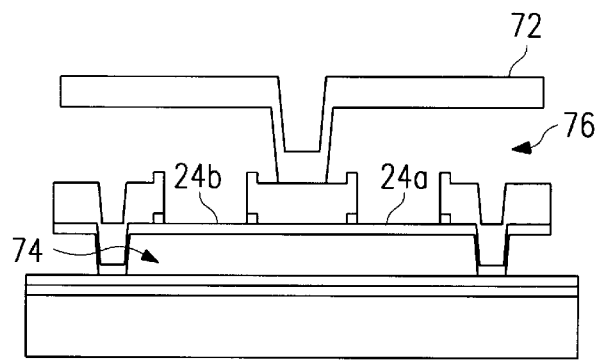

In FIG. 9, a third metal layer has been deposited. This third metal layer fills the via 70 and forms the support post and the reflective surface 72. Finally, in FIG. 10 both spacer layers are removed allowing the deflectable element and its reflective element to move freely.

The spring tips extend from the tips of the deflectable element and are part of the metal layer 64 from FIG. 8. They will deflect about the axis defined by hinges 24*a* and 24*b*, deflecting in the direction out of the paper with reference to the viewer. The spring tips prevent several problems as discussed in detail above. While the above discussion has only been to the specific versions of the problems as they apply to micromechanical spatial light modulators, they are applicable to any micromechanical devices in which there are contacting elements.

Thus, although there has been described to this point a particular embodiment for a method and structure for a micromechanical device with spring tips, it is not intended that such specific references be considered as limitations upon the scope of this invention except in-so-far as set forth in the following claims.

What is claimed is:

1. A micromechanical device comprising:
    a substrate;
    addressing circuitry formed upon said substrate operable to activate said micromechanical device; at least one hinge;
    a deflectable element having a landing tip suspended above said addressing circuitry by at least one hinge;
    at least one landing stop formed on said substrate proximate said addressing circuitry; and
    a flexible tip extending from said landing tip such that when said deflectable element is activated and deflects towards said addressing circuitry, said flexible tip comes in contact with said landing stop.

2. The micromechanical device of claim 1 wherein said micromechanical device is a digital micromirror device.

3. The micromechanical device of claim 1 wherein said micromechanical device is an actuated mirror array.

4. The micromechanical device of claim 1 wherein said deflectable element a cantilever hinge spatial light modulator element.

5. The micromechanical device of claim 1 wherein said deflectable element a torsion hinge spatial light modulator element.

6. The micromechanical device of claim 1 wherein said deflectable element of is a double-level spatial light modulator element.

7. A method of manufacturing a micromechanical device with spring hinges, comprising the steps of:
    forming addressing circuitry upon a substrate;
    forming landing stops upon said substrate proximate to said addressing circuitry;
    spinning a first spacer layer material over said landing stops and said addressing circuitry;
    forming vias in said spacer material;
    depositing a first metal layer such that said first metal layer fills said vias;
    patterning and etching said first metal layer to form support posts, at least one hinge, and at least one metal element separate from said posts and said hinge;
    depositing a second metal layer;
    patterning and etching said second metal layer to form deflectable elements with landing tips, such that said metal elements are attached to said landing tips at the points at which said landing tips will contact said landing stops; and
    removing said spacer material to allow said deflectable element to move freely when activated by said addressing circuitry.

8. The method of claim 7, further comprising the steps of:
    spinning a second spacer layer after the step of patterning and etching said second metal layer but before the step of removing said spacer; forming vias in said second spacer layer;
    depositing a third metal layer such that said third metal layer fills the vias; and
    patterning and etching said third metal layer to form reflective elements.

9. The method of claim 7, wherein said patterning said first metal layer to form at least one hinge step forms one hinge.

10. The method of claim 7, wherein said patterning said first metal layer to form at least one hinge step forms two hinges.

* * * * *

UNITED STATES PATENT AND TRADEMARK OFFICE
CERTIFICATE OF CORRECTION

PATENT NO.   : 5,867,202
DATED        : February 2, 1999
INVENTOR(S)  : Richard L. Knipe, Mark H. Strumpell and Michael A. Mignardi It is certified that error appears in the above-identified patent and that said Letters Patent is hereby corrected as shown below:

<u>Title page,</u>
Item [60], Related U.S. Application Data,
-- Provisional Application No. 60/008,674 Dec. 15, 1995. --

Signed and Sealed this

Thirty-first Day of December, 2002

JAMES E. ROGAN
*Director of the United States Patent and Trademark Office*